Sept. 5, 1933. J. A. DIENNER 1,925,955
FUEL SUPPLY AND INDICATING SYSTEM
Filed May 12, 1924
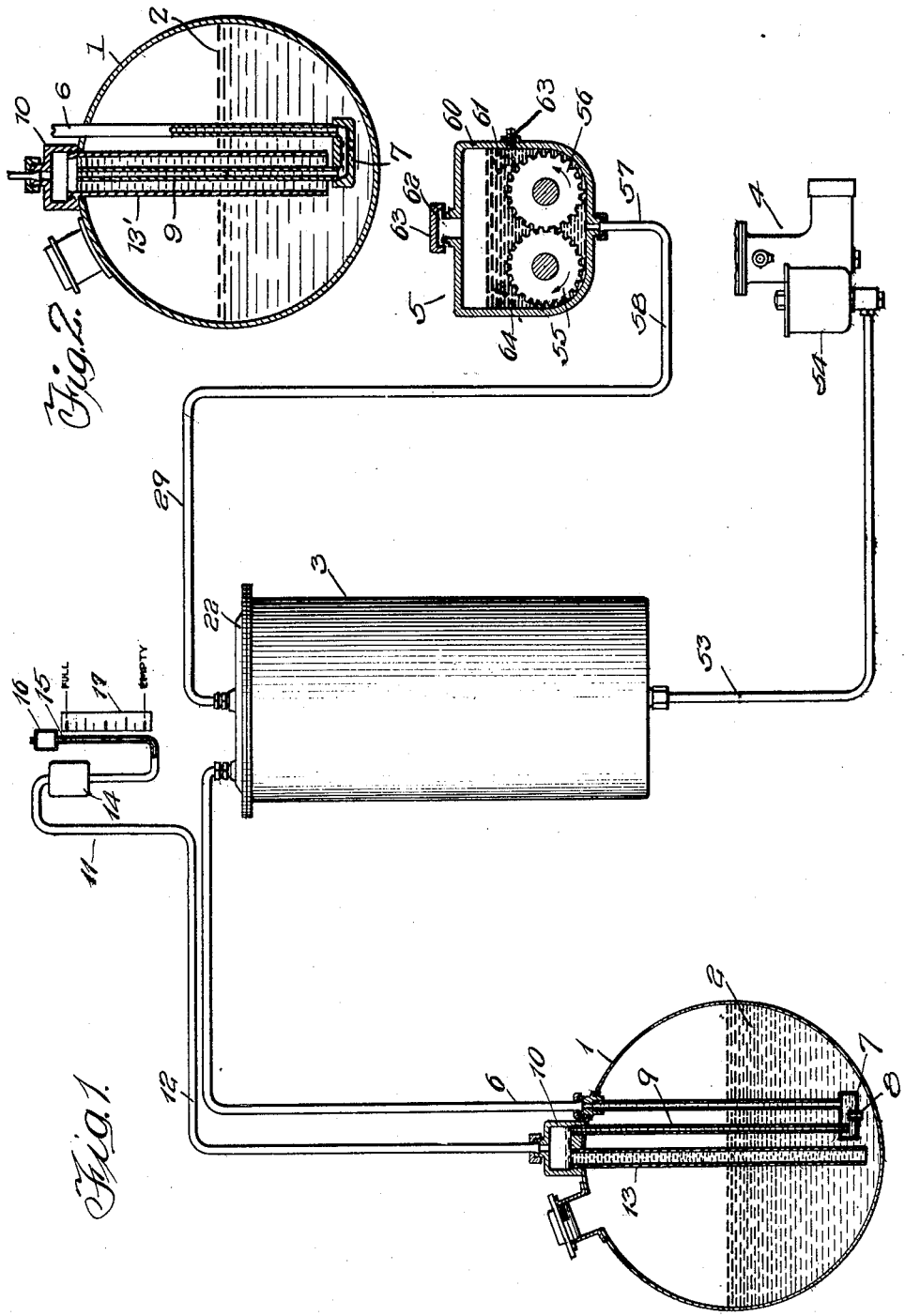

Patented Sept. 5, 1933

1,925,955

UNITED STATES PATENT OFFICE 1,925,955

FUEL SUPPLY AND INDICATING SYSTEM

John A. Dienner, Chicago, Ill., assignor to Bendix Stromberg Carbureter Company, Chicago, Ill., a corporation of Illinois Application May 12, 1924. Serial No. 712,512

13 Claims. (Cl. 73—54)

My invention relates to a fuel supply and indicating system for internal combustion engines, and more particularly for supplying gasoline from an automobile tank at the rear of the vehicle to the carbureter at the higher level and for indicating the level of liquid in the tank.

Primarily, the system provides simple, rotary suction means operating from the engine to draw fuel from the low level liquid fuel supply tank.

In addition, the system provides a dash indication of the contents of the main tank through a pneumatic connection employing a body of air which is maintained at suitable subatmospheric pressure.

My invention provides, further, a simplified vacuum tank and suction producing means therefor for use in a system of this character.

In order to acquaint those skilled in the art with the manner of constructing and operating my invention, I shall now describe a specific embodiment of the same in connection with the accompanying drawing.

In the drawing:

Fig. 1 is an elevational view partly in section of a system embodying my invention; and Fig. 2 is a vertical sectional view of a modified form of liquid withdrawing and indicating means;

As shown in Fig. 1, a main gasoline tank 1 contains liquid fuel 2 which is withdrawn therefrom by means of the vacuum tank 3 and delivered to the carbureter 4. A rotary pump 5 of special construction provides the suction for the vacuum tank 3.

The tank 1 has the liquid withdrawal pipe 6 connected thereto, with pipe 6 terminating in a chamber or manifold 7 which connects through a restricted opening 8 with the liquid 2 in the tank 1 and communicates by way of a pipe 9 of restricted cross section with the air trap 10 of the indicating system. The indicating system comprises the manometer 11 or other indicator graduated in terms of liquid level in the tank 1 and a small bore pipe or tube connection 12 to said air trap 10. The air trap 10, in addition to being connected to the pipe 9, as shown, also has a depending leg or pipe connection 13, which should be of relatively ample diameter, leading down to the full depth of liquid to be measured in the tank 2. In the present case, the manometer 11 comprises a U-tube havig a large diameter leg 14 and a small diameter or indicating leg 15. Both legs are adapted to contain a suitable indicating liquid which stands normally at equal levels in each of the legs 14 and 15. The leg 14 is shown as enlarged at its upper end for the reason that the pipe 12 and the air trap 10 are put under subatmospheric pressure which corresponds to the head of liquid in the pipe 13 or 9 above the level of the liquid 2 in the tank 1. If this suction should become too great, the indicating liquid may all be drawn out of the leg 15 over into the leg 14 and air drawn through said indicating leg and through a part of the storage leg 14 to clear out any air in the system. The parts may be so designed that upon each operation of the vacuum tank 3 sufficient suction will be put upon the air trap 10 to cause lowering of the liquid in the indicating leg down to the bottom of the turn to cause air to be drawn over into the indicating system. The indicating leg 15 is provided with a liquid trap 16 at the upper end thereof, so that in case of any accidental pressure being placed upon the tank 1, such as might be caused by careless filling of said tank 1, the liquid will not be expelled from the indicator. A suitable scale 17 is provided for reading the indication on the leg 15. It will be noted that when the tank 1 is full the liquid in the leg 15 will stand at the top of the scale indicated as full, and when the tank 1 is substantially empty the level of liquid in the indicating leg will go down to the point marked empty.

The manometer which I have shown is particularly useful in permitting the discharge of air through the system for each operation of the tank 3.

In Fig. 2, I have illustrated a modification in which the pipe 9, instead of being extended externally into the bottom of the air trap 10, is extended into the air trap at the proper level by passing through the enlarged indicating tube 13', which is made sufficiently large to include the tube 9 and permit the drawing of liquid up through said pipe 13' and down through said pipe 9 when the suction tank draws on the pipe 6.

If desired, the pipe 13' may be a continuation of the air trap 10 of the same diameter or other diameter.

It will be noted that in Fig. 1 the pipe 9 extends downward below the top of said box or chamber 7, preferably to avoid the reintroduction of air into the system through said pipe 9 in case bubbles of air are carried back by the liquid dropping back through the pipe 6 from the tank 3. At the same time, the inlet opening is formed of a short length of pipe which extends past the lower end of the pipe 9, so that any air or vapor which may be drawn through said opening 8 will tend to pass up the pipe 6 and not up the pipe 9.

The pump 5 provides a novel structure, which consists of a pair of gears 55 and 56 closely meshing and being mounted in a chamber which fits the ends and the lower sides of the gears 55 and 56, said gears meshing together at the center. The lower part of the chamber has an inlet or suction passageway 57 which is connected through a U-shaped tube 58 forming a part of the suction connection 29. The chamber 60 is adapted to contain a body of lubricating oil 61 and, at its upper end, the chamber communicates by way of a passageway 62 preferably with atmosphere, a suitable dust cap 63 being placed over the opening 62 to prevent the entry of foreign matter into said body of oil 61. A draining plug 63 is provided at any suitable point. The body of oil 61 tends to fill a part of said U-pipe 58 and be therein trapped. This pump 5 is preferably placed near the engine shaft or cam shaft of the engine and may be run directly from said cam shaft at one end of the frame. If desired, it may be put upon one end of the common pump, generator and distributor shaft which is in common use in modern automobile engines. The operation of this particular unit is highly advantageous in an automobile in that the pump 5 may be placed at a relatively low point and run directly by the engine, the gears 55 and 56 meshing and being driven in the direction of the arrows so as to withdraw first the liquid from the trap formed in said pipe 58 and then to draw air and discharge the same up through the body of oil 61, as indicated by the bubbles 64.

This rotary pump is highly desirable in that it affords little friction and is inherently lubricated by the body of oil 61 and it always remains sufficiently tight because the parts work under oil and are, in fact, sealed by the oil. I wish, furthermore, to point to an important advantage in this connection; that is, that if, by any mischance, liquid should be drawn over into said rotary pump 5, it will do no damage whatsoever other than to cause running over through the passageway 62, and this may be provided to drain upon the ground below the engine. It is well known that a reciprocating pump operating at high speed is not a satisfactory device for securing suction in a vacuum tank, nor for compressing air, since the valves will not operate at high speeds and there is always danger of smashing the pump by drawing a slug of liquid. Furthermore, a piston type of pump requires lubrication which it almost never gets. In this rotary pump there are no valves, and hence, no matter how fast the wheels 55 and 56 are operated, there will be no failure to draw air and no leakage of any valves. Furthermore, the placing of this rotary element in the U-shaped pipe 58 traps the liquid 61 so that it never runs out of the system. It will be understood that this rotary pump 5 is preferably placed below the level of the tank 3, although, because of limitations, it has not been so shown upon the diagram.

The gears 55 and 56 are preferably herringbone gears.

I do not intend to be limited to the details shown or described.

I claim:

1. In a system of the class described, a tank for liquid, an indicating system comprising a chamber communicating with the liquid at substantially the full depth to be measured and a fluid pressure actuated indicating device graduated in terms of the level of the liquid in said tank connected to said chamber, and a U-shaped passageway having one leg communicating with the interior of said chamber and forming a passage through which air may be withdrawn from said chamber, the lower part of said U-shaped passageway extending below the level of liquid in said tank, and said means connected with said U-shaped passage and operable through said passage for withdrawing air from said chamber.

2. In a system of the class described, a tank for liquid, a chamber communicating with the liquid in the lower part of the tank, a pressure actuated level indicator, means connecting said indicator with said chamber, and liquid sealed means extending into the liquid in the tank, and forming a passage through which air may be withdrawn from said chamber, said means communicating with said chamber at a point lying at a level substantially equal to the high level of the liquid in the tank, and means connected with said liquid sealed means and operable through said passage for withdrawing air from said chamber.

3. An indicating system comprising a fluid pressure actuated indicator, a tank for liquid, a conduit extending from the indicator to the lower part of the tank, and a suction tube part communicating with the liquid in the tank and extending from below the liquid in the tank to a point in the conduit corresponding substantially with high level of liquid in the tank.

4. In combination, a tank for liquid, a liquid level indicator, a suction tube part extending therefrom to the lower part of the tank, and means to maintain a column of liquid in said suction tube when the withdrawing means is operative and comprising a liquid withdrawing conduit extending to substantially the bottom of the tank, and a connection between the lower portion of said conduit and the suction tube at a point above the level of liquid in the tank.

5. In combination, a tank for liquid, a level indicating system comprising a conduit extending into the liquid in the tank to substantially the bottom thereof and opening at its lower end into the said liquid, said conduit having a pneumatically actuated indicator at the other end and a vacuum feeding system associated with said conduit intermediate its ends for drawing air and liquid from said conduit, said feeding system comprising a pipe disposed inside the lower end of said conduit and opening into the same at substantially high level of liquid in the tank.

6. In combination, in a fuel supply and indicating system for internal combustion engines, a low level liquid fuel supply tank open at the top, a pipe of relatively large size extending to and freely opening into the lower part of the tank, the pipe terminating at its upper end in a gas chamber, a fluid pressure actuated indicator, a tube connecting said gas chamber with with said indicator, an automatically operating high level suction device for drawing fuel by suction from the tank in accordance with the demands of the engine, a tube leading from said suction device to said chamber for maintaining a predetermined datum level in said chamber, said latter tube providing a relatively restricted connection with the liquid in said chamber and including a liquid trap for preventing the entry of air into the chamber.

7. In combination, in a fuel supply and indicating system for internal combustion engines, a low level liquid fuel supply tank open at the top, a pipe of relatively large size extending to and freely opening into the lower part of the tank, the pipe terminating at its upper end in a gas chamber, a fluid pressure actuated indicator, a tube connecting said gas chamber with said indicator, an automatically operating high level suction device for drawing fuel by suction from the tank in accordance with the demands of the engine, a tube leading from said suction device to the bottom of the tank for drawing liquid from the tank, and a branch connection of relatively small size as compared with said pipe leading into said chamber, and means for maintaining a seal upon said branch connection for preventing the entry of air into the chamber.

8. In combination, a tank for liquid, a pneumatic indicating system comprising an indicator and a suction tube connected to the indicator and communicating with the liquid at substantially the full depth to be measured, means for withdrawing liquid from the tank comprising a conduit extending to the lower part of the tank and communicating with the liquid therein, and a branch conduit connected to said withdrawing conduit at the lower part of the tank and extending to a point in the suction tube at substantially high level in the tank.

9. In combination, in a fuel supply and indicating system for an internal combustion engine, a liquid fuel supply tank, a gas chamber having a passageway extending to the lower portion of the tank, a fluid pressure actuated indicator, a tube connecting the said indicator with said chamber, automatic fuel withdrawing means for withdrawing fuel from said tank for the demand of said engine, a tube leading from said fuel withdrawing means to the bottom of the tank and a relatively small tube having one end opening into said chamber and the other end extending into said fuel withdrawing tube below the liquid level in the tank.

10. In an apparatus of the character described, the combination with a tank for liquids, of a tube having its upper end above the tank and its lower end opening into the tank adjacent the bottom thereof, a suction pipe communicating with said tube at a point above the top of the tank and having a depending bend extending below the lower end of said tube whereby to form a liquid seal, a suction device connected to the other end of said suction pipe, a pressure responsive gauge, and a gauge pipe leading from the upper end of said tube to said gauge.

11. In an apparatus of the character described, a tank for liquid, a tube having a closed upper end located above the maximum liquid level in said tank and extending downwardly into said tank and communicating therewith at a minimum measurable liquid level therein, a suction pipe communicating at the upper portion of said tube at a point above the maximum liquid level in said tank and including a depending bend extending below said minimum liquid level to form a liquid seal, means connected to the other end of said suction pipe to intermittently produce suction therein and adapted to raise the liquid from said tank into said tube and pipe whereby to establish a constant liquid level in said tube at the intake end of said suction pipe, a pressure responsive gauge, and a gauge pipe leading from said gauge and communicating with said tube at a point above the communication of said suction pipe therewith, whereby said depending bend will operate to maintain said constant liquid level during intervals between the intermittent suction effects.

12. In combination in a fuel supply and indicating system for an internal combustion engine having a suction-operated fuel supply device, a main liquid supply tank, a tube having its closed upper end extending above the maximum liquid level in said main tank and communicating at its lower end with said main tank near the bottom thereof, a suction pipe for connecting said suction-operated fuel supply device with said tube adjacent the top thereof whereby the liquid fuel may be sucked from the main tank through said tube and pipe to supply said engine and including a depending bend extending below the open lower end of said tube, a pressure responsive gauge, and a gauge pipe for establishing communication between said gauge and said tube at a point above the suction pipe connection therewith.

13. In a device for indicating the levels of a liquid in a tank, a casing, a riser tube connected to said casing, opening into the lower part thereof, and depending therefrom, a gauge tube connected to said casing, opening into the upper part thereof, and extending upwardly a distance such that the distance between the lower end of the riser tube and the upper end of the gauge tube will exceed the maximum difference in liquid levels to be indicated, and a suction tube connected to said casing, opening therein at a level below the opening of the gauge tube into said casing, extending to a level below the opening in the lower end of said riser tube, then upwardly for a distance exceeding the said maximum difference in levels to be indicated.

JOHN A. DIENNER.

CERTIFICATE OF CORRECTION.

Patent No. 1,925,955.  September 5, 1933.

JOHN A. DIENNER.

It is hereby certified that error appears in the printed specification of the above numbered patent requiring correction as follows: In the grant, line 2, name of assignee, for "Bendix Stromberg Company" read Bendix Stromberg Carbureter Company; page 2, line 81, claim 1, strike out the word "said" second occurrence; and that the said Letters Patent should be read with these corrections therein that the same may conform to the record of the case in the Patent Office.

Signed and sealed this 21st day of November, A. D. 1933.

F. M. Hopkins (Seal)  Acting Commissioner of Patents.